United States Patent
Pistoia et al.

(10) Patent No.: US 10,832,173 B1
(45) Date of Patent: Nov. 10, 2020

(54) COGNITIVE SOFTWARE DEVELOPMENT

(71) Applicant: International Business Machines Corporation, Armonk, NY (US)

(72) Inventors: Marco Pistoia, Amawalk, NY (US); Joseph Ligman, Wilton, CT (US); Stephen Wood, Thornwood, NY (US); Shaohan Hu, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/554,061

(22) Filed: Aug. 28, 2019

(51) Int. Cl.
*G06F 8/70* (2018.01)
*G06N 20/00* (2019.01)
*G06F 16/903* (2019.01)
*G06Q 30/02* (2012.01)
*G06F 40/20* (2020.01)

(52) U.S. Cl.
CPC ....... *G06N 20/00* (2019.01); *G06F 16/90335* (2019.01); *G06F 40/20* (2020.01); *G06Q 30/0201* (2013.01); *G06F 8/70* (2013.01)

(58) Field of Classification Search
CPC ... G06N 20/00; G06F 40/20; G06F 16/90335; G06F 8/70; G06Q 30/0201
See application file for complete search history.

(56) References Cited

U.S. PATENT DOCUMENTS

| | | | |
|---|---|---|---|
| 6,658,643 B1 | 12/2003 | Bera | |
| 6,938,007 B1 * | 8/2005 | Iulianello | G06Q 30/04 705/34 |
| 8,489,448 B2 | 7/2013 | Hilkemeyer et al. | |
| 2004/0148209 A1 | 7/2004 | Church et al. | |
| 2004/0186757 A1 * | 9/2004 | Starkey | G06Q 10/06398 705/7.22 |
| 2008/0312980 A1 | 12/2008 | Boulineau et al. | |

(Continued)

OTHER PUBLICATIONS

Boehm et al., "Cost models for future software life cycle processes: COCOMO 2.0," Annals of software engineering 1, No. 1 (1995): 57-94.

(Continued)

*Primary Examiner* — Daxin Wu
(74) *Attorney, Agent, or Firm* — Garg Law Firm, PLLC; Rakesh Garg; Anthony Curro (57) ABSTRACT

In an embodiment, a method of estimating the cost of a software project comprising receiving natural language software descriptions and electronic source code files for respective completed software projects; storing, in a computer memory, an input set of functional labels and size data extracted from each of the source code files, the functional labels corresponding to labels in a software development library; training a natural language processing model to output a project set of functional labels for one of the source code files; training a regression analysis model to output a project size for the one of the source code files; predicting, using the natural language understanding model, a proposal set of functional labels; predicting, using the regression analysis model, a proposal size; and using the proposal size to calculate a proposal cost; and preparing a software development proposal that includes a natural language proposed-software description and the proposal cost.

20 Claims, 5 Drawing Sheets

(56) References Cited

U.S. PATENT DOCUMENTS

2017/0364824 A1* 12/2017 Boyer ............... G06Q 10/0833
2018/0307481 A1* 10/2018 Ganesan ............... G06F 16/254
2018/0307998 A1 10/2018 Strachan et al.
2020/0057632 A1* 2/2020 Harsukhlal Sodha .... G06F 8/31

OTHER PUBLICATIONS

Boehm et al., "Software development cost estimation approaches—A survey," Annals of software engineering 10, No. 1-4 (2000): 177-205.
Valerdi, "Heuristics for Systems Engineering Cost Estimation," in IEEE Systems Journal, vol. 5, No. 1, pp. 91-98.
Valerdi, "The Constructive Systems Engineering Cost Model (COSYSMO)", Aug. 2005, University of Southern California.
Choetkiertikul et al., "A deep learning model for estimating story points", Sep. 6, 2016, arXiv:1609.00489v2.
Symons, "Function Point Analysis: Difficulties and Improvements", IEEE Transactions on Software Engineering, vol. 14, No. I , Jan. 1988.
Coelho et al., "Effort Estimation in Agile Software Development using Story Points", International Journal of Applied Information Systems (IJAIS) —ISSN : 2249-0868, Foundation of Computer Science FCS, New York, USA, vol. 3—No. 7, Aug. 2012.
Wikipedia, "Weighted Micro Function Points", 2019, https://en.wikipedia.org/wiki/Weighted_Micro_Function_Points.
Price, "Predictice Power. Confident Estimates.", 2019, Cost Estimation Software—Price Cost Analytics | Price Systems, https://www.pricesystems.com/.

* cited by examiner

COGNITIVE SOFTWARE DEVELOPMENT

TECHNICAL FIELD

The present invention relates generally to software development. More particularly, the present invention relates to using Artificial-Intelligence to assist with predicting various aspects of software development projects.

BACKGROUND

Software project planning involves estimating various aspects of a proposed software project, such as estimating an amount of effort involved in creating a software product of some given scope, or predicting a project scope that can be accomplished for a given effort. For example, software cost estimation is one common task, and it presents a complex problem that has been the subject of a great amount of research, which has yielded numerous estimation methods. Current cost estimation methods include expert-based methods and algorithmic model-based methods. Expert-Based Methods involve having an expert prepare a subjective estimate of effort required based on the expert's experience with developing and/or managing similar projects. Algorithmic model-based methods use mathematical models to calculate an estimate and include examples such as Agile and non-Agile estimation methods, Constructive Cost Model (COCOMO), and Constructive Systems Engineering Cost Model (COSYSMO), among many others.

Agile estimation computes project scope for a fixed development amount of effort, usually involving fixed time and expense, whereas non-agile estimation computes an amount of development effort (e.g., time and expense) for a fixed project scope. COCOMO computes software development effort and cost as a function of program size and "cost drivers" that include a subjective assessment of product, hardware, personnel, and project attributes. COSYSMO computes software development effort as a function of program size and environmental factors, such as architecture, migration complexity, technology risk, and several others related to systems engineering.

Regardless of which approach is taken, software cost estimation is a complex problem that frequently yields inaccurate results. The reasons for complexity and inaccuracy vary from one segment of the software industry to another, but frequently-cited factors include project uniqueness, lack of project clarity, and inherent human optimism. A new software project often involves addressing unique problems, providing the estimator with no historical context for predicting the associated effort. Also, the estimator may be asked to prepare a cost estimate early in the process while the scope of the project is not yet entirely complete, leaving the estimate vulnerable to "scope creep" where the scope changes over time. These two factors lead to some amount of guesswork on the part of the estimator, which is affected by the human tendency towards optimism that frequency result in underestimation.

SUMMARY

The illustrative embodiments provide a method, system, and computer program product for preparing an estimate for a software project. In an embodiment, the method includes receiving a natural language (NL) software description for a completed software project. The computer implemented method also includes receiving an electronic source code file for the completed software project. The computer implemented method also includes storing, in the computer memory, a first input set of functional labels assembled in a software development library. The computer implemented method also includes storing, in a computer memory, a second input set of functional labels and size data extracted from the electronic source code file of the completed software project, each the second input set of functional labels corresponding to at least one of the labels in the first input set of functional labels, the completed software project having a corresponding NL software description. The computer implemented method also includes training a NL processing model such that the model outputs a project set of functional labels for the source code file using the NL software description as an input sample corresponding to functional labels from the second input set of functional labels. The computer implemented method also includes training a regression analysis model such that the model outputs a project size for the source code file using the project set of functional labels as an input sample corresponding to a project size from the size data. The computer implemented method also includes predicting, using the NL processing model, a proposal set of functional labels. The computer implemented method also includes predicting, using the regression analysis model, a proposal size. The computer implemented method also includes calculating a proposal cost based at least in part on the proposal size. The computer implemented method also includes preparing a software development proposal that includes a NL proposed-software description and the proposal cost. Other embodiments of this aspect include corresponding computer usable program products and computer systems configured to perform the actions of the methods.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

In predicting costs associated with a proposed software project, a software manager often relies upon a resource estimating tool, such as a resource estimating software application. Such resource estimating tools are well known and are able to provide software managers with considerable assistance in managing a software development project.

However, such resource estimating tools still require a software manager to subjectively assess and predict various aspects of the software project. The estimating tools then use these predicted values to create an estimate for the software project. These existing estimating tools are helpful, but are limited by the accuracy of the subjective predictions that users provide.

The illustrative embodiments recognize that there is a need to improve the accuracy of estimating tools used for estimating costs of new software projects by using machine learning and natural language processing (NLP) to achieve software cost estimation. In some embodiments, the process utilizes user stories that are prepared by software developers near the beginning of a software development lifecycle. User stories are descriptions of different functionalities that the intended software program or application is supposed to implement.

The terms "software," "software program," "program," "software application," and "application," as used herein, have the same meaning and are therefore used interchangeably herein. For example, a "software project," as used herein, refers equally to any of the interchangeable terms "software," "software program," "program," "software application," and "application."

In some embodiments, sets of user stories are created for software updates and at other points in the lifecycle. The user stories are sometimes published in software repositories that are publicly available. Some software companies also have internal repositories that are open to employees and include user stories or similar documentation that is descriptive of software features. The user stories typically reference specific code that corresponds to implementation of particular features of a software.

Embodiments disclosed herein recognize that these repositories containing natural-language descriptions (i.e., User Stories) of implemented software features constitute a vast untapped resource for historic data regarding the effort associated with the implementation of various software features. As a result, embodiments herein make use of this previously untapped resource to provide a historic basis for predicting the effort or cost involved to implement software features and thereby realize improved accuracy in the resulting software cost estimates.

Some embodiments apply artificial intelligence methods to a natural language description of a proposed software project as part of a process of estimating a cost of the proposed software project. Some embodiments apply artificial intelligence methods to a natural language description of a proposed software project to obtain a prediction of a size of the proposed software project, and then use the predicted size to calculate an estimated cost of the proposed software project. Some embodiments apply artificial intelligence methods to a natural language description of a proposed software project to obtain a prediction of a project set of functional labels of the proposed software project, and then apply artificial intelligence methods to the predicted project set of functional labels as part of a process of estimating a cost of the proposed software project. Some embodiments apply artificial intelligence methods to a natural language description of a proposed software project to obtain a prediction of a project set of functional labels of the proposed software project, and then apply artificial intelligence methods to the predicted project set of functional labels to obtain a prediction of a size of the proposed software project, and then use the predicted size to calculate an estimated cost of the proposed software project.

Some embodiments apply artificial intelligence methods to a set of functional labels of a proposed software project as part of a process of estimating a cost of the proposed software project. Some embodiments apply artificial intelligence methods to a set of functional labels of a proposed software project to obtain a prediction of a size of the proposed software project, and then use the predicted size to calculate an estimated cost of the proposed software project. Some embodiments use a regression analysis model to process a set of functional labels of a proposed software project and obtain a prediction of a size of the proposed software project, and then use the predicted size to calculate an estimated cost of the proposed software project.

Some embodiments apply artificial intelligence methods to a natural language description of a proposed software project to obtain a prediction of a project set of functional labels of the proposed software project, and then apply artificial intelligence methods to the predicted project set of functional labels as part of a process of estimating a cost of the proposed software project. Some embodiments apply artificial intelligence methods to a natural language description of a proposed software project to obtain a prediction of a project set of functional labels of the proposed software project, and then apply artificial intelligence methods to the predicted project set of functional labels to obtain a prediction of a size of the proposed software project as part of a process of estimating a cost of the proposed software project. Some embodiments apply artificial intelligence methods to a natural language description of a proposed software project to obtain a prediction of a project set of functional labels of the proposed software project, and then apply artificial intelligence methods to the predicted project set of functional labels to obtain a prediction of a size of the proposed software project, and then perform a calculation using the predicted size to determine an estimated cost of the proposed software project.

Some embodiments use an NLP classifier model to process a natural language description of a proposed software project and obtain a prediction of a project set of functional labels of the proposed software project, and then use a regression analysis model to process the predicted project set of functional labels as part of a process of estimating a cost of the proposed software project. Some embodiments use an NLP classifier model to process a natural language description of a proposed software project to obtain a prediction of a project set of functional labels of the proposed software project, and then use a regression analysis model to process the predicted project set of functional labels to obtain a prediction of a size of the proposed software project as part of a process of estimating a cost of the proposed software project. Some embodiments use an NLP classifier model to process a natural language description of a proposed software project to obtain a prediction of a project set of functional labels of the proposed software project, and then use a regression analysis model to process the predicted project set of functional labels to obtain a prediction of a size of the proposed software project, and then perform a calculation using the predicted size to determine an estimated cost of the proposed software project.

Some embodiments use natural-language descriptions of previously-implemented software features as part of a process of estimating a cost of a proposed software project. Some embodiments use natural-language descriptions of previously-implemented software features to train an NLP classifier model as part of a process of obtaining a prediction of a size of the proposed software project, and then use the predicted size to calculate an estimated cost of the proposed software project. s and then use the predicted project set of functional labels to calculate an estimated cost of the proposed software project.

Some embodiments use natural-language descriptions of previously-implemented software features as part of a process of estimating a cost of the proposed software project. Some embodiments use natural-language descriptions of previously-implemented software features to train an NLP classifier model as part of a process of obtaining a prediction of a cost of the proposed software project. Some embodiments use natural-language descriptions of previously-implemented software features to train an NLP classifier model to predict a project set of functional labels for a given natural-language description of a proposed software project, and then apply artificial intelligence methods to the predicted project set of functional labels as part of a process of estimating a cost of the proposed software project. Some embodiments use natural-language descriptions of previously-implemented software features to train an NLP classifier model to predict a project set of functional labels of a proposed software project, and then apply artificial intelligence methods to the predicted project set of functional labels to obtain a prediction of a size of the proposed software project, and then use the predicted size to calculate an estimated cost of the proposed software project.

Some embodiments use sets of functional labels of previously-implemented software projects as part of a process of estimating a cost of the proposed software project. Some embodiments use sets of functional labels of previously-implemented software projects to train a regression analysis model as part of a process of obtaining a prediction of a cost of the proposed software project. Some embodiments use sets of functional labels of previously-implemented software projects to train a regression analysis model to predict a size for a given sets of functional labels of a proposed software project as part of a process of estimating a cost of the proposed software project. Some embodiments use sets of functional labels of previously-implemented software projects to train a regression analysis model to predict a size for a given set of functional labels of a proposed software project, and then use the predicted size to calculate an estimated cost of the proposed software project.

Some embodiments use natural-language descriptions of previously-implemented software features and sets of functional labels of previously-implemented software projects as part of a process of estimating a cost of the proposed software project. Some embodiments use natural-language descriptions of previously-implemented software features to train an NLP classifier model and use sets of functional labels of previously-implemented software projects to train a regression analysis model as part of a process of obtaining a prediction of a cost of the proposed software project. Some embodiments use natural-language descriptions of previously-implemented software features to train an NLP classifier model to predict a project set of functional labels for a given natural-language description of a proposed software project, and then use sets of functional labels of previously-implemented software projects to train a regression analysis model to predict a size for the predicted project set of functional labels of the proposed software project as part of a process of estimating a cost of the proposed software project. Some embodiments use natural-language descriptions of previously-implemented software features to train an NLP classifier model to predict a project set of functional labels of a proposed software project, and then use project sets of functional labels of previously-implemented software projects to train a regression analysis model to predict a size for a given project set of functional labels of a proposed software project, and then use the predicted size to calculate an estimated cost of the proposed software project.

Some embodiments use sets of functional labels from a software development library as part of a process of estimating a cost of the proposed software project. Some embodiments use sets of functional labels from a software development library to train a regression analysis model as part of a process of obtaining a prediction of a cost of the proposed software project. Some embodiments use sets of functional labels from a software development library to train a regression analysis model to predict a size for a given set of functional labels of a proposed software project as part of a process of estimating a cost of the proposed software project. Some embodiments use sets of functional labels from a software development library to train a regression analysis model to predict a size for a given set of functional labels of a proposed software project, and then use the predicted size to calculate an estimated cost of the proposed software project.

Some embodiments use natural-language descriptions of previously-implemented software features and sets of functional labels from a software development library as part of a process of estimating a cost of the proposed software project. Some embodiments use natural-language descriptions of previously-implemented software features to train an NLP classifier model and use sets of functional labels from a software development library to train a regression analysis model as part of a process of obtaining a prediction of a cost of the proposed software project. Some embodiments use natural-language descriptions of previously-implemented software features to train an NLP classifier model to predict a set of functional labels for a given natural-language description of a proposed software project, and then use sets of functional labels from a software development library to train a regression analysis model to predict a size for the predicted set of functional labels of the proposed software project as part of a process of estimating a cost of the proposed software project. Some embodiments use natural-language descriptions of previously-implemented software features to train an NLP classifier model to predict a project set of functional labels of a proposed software project, and then use sets of functional labels from a software development library to train a regression analysis model to predict a size for a given set of functional labels of a proposed software project, and then use the predicted size to calculate an estimated cost of the proposed software project.

Some embodiments use sets of functional labels of previously-implemented software projects and sets of functional labels from a software development library as part of a process of estimating a cost of the proposed software project. Some embodiments use sets of functional labels of previously-implemented software projects and sets of functional labels from a software development library to train a regression analysis model as part of a process of obtaining a prediction of a cost of the proposed software project. Some embodiments use sets of functional labels of previously-implemented software projects and sets of functional labels from a software development library to train a regression analysis model to predict a size for a given set of functional labels of a proposed software project as part of a process of estimating a cost of the proposed software project. Some embodiments use sets of functional labels of previously-implemented software projects and sets of functional labels from a software development library to train a regression analysis model to predict a size for a given set of functional labels of a proposed software project, and then use the predicted size to calculate an estimated cost of the proposed software project.

Some embodiments use natural-language descriptions of previously-implemented software features, sets of functional labels of previously-implemented software projects, and sets of functional labels from a software development library as part of a process of estimating a cost of the proposed software project. Some embodiments use natural-language descriptions of previously-implemented software features to train an NLP classifier model and use sets of functional labels of previously-implemented software projects and sets of functional labels from a software development library to train a regression analysis model as part of a process of obtaining a prediction of a cost of the proposed software project. Some embodiments use natural-language descriptions of previously-implemented software features to train an NLP classifier model to predict a set of functional labels for a given natural-language description of a proposed software project, and then use sets of functional labels of previously-implemented software projects and sets of functional labels from a software development library to train a regression analysis model to predict a size for the predicted set of functional labels of the proposed software project as part of a process of estimating a cost of the proposed software project. Some embodiments use natural-language descriptions of previously-implemented software features to train an NLP classifier model to predict a set of functional labels of a proposed software project, and then use sets of functional labels of previously-implemented software projects and sets of functional labels from a software development library to train a regression analysis model to predict a size for a given project set of functional labels of a proposed software project, and then use the predicted size to calculate an estimated cost of the proposed software project.

Some embodiments use sets of functional labels of previously-implemented software projects and sets of functional labels from a Software Development Kit (SDK) or Application Programming Interface (API) as part of a process of estimating a cost of the proposed software project. Some embodiments use sets of functional labels of previously-implemented software projects and sets of functional labels from a Software Development Kit (SDK) or Application Programming Interface (API) to train a regression analysis model as part of a process of obtaining a prediction of a cost of the proposed software project. Some embodiments use sets of functional labels of previously-implemented software projects and sets of functional labels from a Software Development Kit (SDK) or Application Programming Interface (API) to train a regression analysis model to predict a size for a given set of functional labels of a proposed software project as part of a process of estimating a cost of the proposed software project. Some embodiments use sets of functional labels of previously-implemented software projects and sets of functional labels from a Software Development Kit (SDK) or Application Programming Interface (API) to train a regression analysis model to predict a size for a given set of functional labels of a proposed software project, and then use the predicted size to calculate an estimated cost of the proposed software project.

Some embodiments use sets of functional labels of previously-implemented software projects and sets of functional labels assembled by a software development library from a Software Development Kit (SDK) or Application Programming Interface (API) as part of a process of estimating a cost of the proposed software project. Some embodiments use sets of functional labels of previously-implemented software projects and sets of functional labels assembled by a software development library from a Software Development Kit (SDK) or Application Programming Interface (API) to train a regression analysis model as part of a process of obtaining a prediction of a cost of the proposed software project. Some embodiments use sets of functional labels of previously-implemented software projects and sets of functional labels assembled by a software development library from a Software Development Kit (SDK) or Application Programming Interface (API) to train a regression analysis model to predict a size for a given set of functional labels of a proposed software project as part of a process of estimating a cost of the proposed software project. Some embodiments use sets of functional labels of previously-implemented software projects and sets of functional labels assembled by a software development library from a Software Development Kit (SDK) or Application Programming Interface (API) to train a regression analysis model to predict a size for a given set of functional labels of a proposed software project, and then use the predicted size to calculate an estimated cost of the proposed software project.

Some embodiments use sets of functional labels of previously-implemented software projects and sets of functional labels assembled by a software development library from a Software Development Kit (SDK) or Application Programming Interface (API) as part of a process of estimating a cost of the proposed software project. Some embodiments use sets of functional labels of previously-implemented software projects and sets of functional labels assembled by a software development library from a Software Development Kit (SDK) or Application Programming Interface (API) to train a regression analysis model as part of a process of obtaining a prediction of a cost of the proposed software project. Some embodiments use sets of functional labels of previously-implemented software projects and sets of functional labels assembled by a software development library from a Software Development Kit (SDK) or Application Programming Interface (API) to train a regression analysis model to predict a size for a given set of functional labels of a proposed software project as part of a process of estimating a cost of the proposed software project. Some embodiments use sets of functional labels of previously-implemented software projects and sets of functional labels assembled by a software development library from a Software Development Kit (SDK) or Application Programming Interface (API) to train a regression analysis model to predict a size for a given set of functional labels of a proposed software project, and then use the predicted size to calculate an estimated cost of the proposed software project.

Some embodiments use natural-language descriptions of previously-implemented software features, sets of functional labels of previously-implemented software projects, and sets of functional labels from a software development library as part of a process of estimating a cost of the proposed software project. Some embodiments use natural-language descriptions of previously-implemented software features to train an NLP classifier model and use sets of functional labels of previously-implemented software projects and sets of functional labels from a software development library to train a regression analysis model as part of a process of obtaining a prediction of a cost of the proposed software project. Some embodiments use natural-language descriptions of previously-implemented software features to train an NLP classifier model to predict a set of functional labels for a given natural-language description of a proposed software project, and then use sets of functional labels of previously-implemented software projects and sets of functional labels from a software development library to train a regression analysis model to predict a size for the predicted set of functional labels of the proposed software project as part of a process of estimating a cost of the proposed software project. Some embodiments use natural-language descriptions of previously-implemented software features to train an NLP classifier model to predict a set of functional labels of a proposed software project, and then use sets of functional labels of previously-implemented software projects and sets of functional labels from a software development library to train a regression analysis model to predict a size for a given set of functional labels of a proposed software project, and then use the predicted size to calculate an estimated cost of the proposed software project.

Some embodiments apply artificial intelligence methods to a natural language description of a proposed software project to obtain a prediction of a set of functional labels of the proposed software project, and then apply artificial intelligence methods to the predicted set of functional labels as part of a process of estimating a cost of the proposed software project. Some embodiments apply artificial intelligence methods to a natural language description of a proposed software project to obtain a prediction of a set of functional labels of the proposed software project, and then apply artificial intelligence methods to the predicted set of functional labels to obtain a prediction of a size of the proposed software project as part of a process of estimating a cost of the proposed software project. Some embodiments apply artificial intelligence methods to a natural language description of a proposed software project to obtain a prediction of a set of functional labels of the proposed software project, and then apply artificial intelligence methods to the predicted set of functional labels to obtain a prediction of a size of the proposed software project, and then perform a calculation using the predicted size to determine an estimated cost of the proposed software project.

Some embodiments use an NLP classifier model to process a natural language description of a proposed software project and obtain a prediction of a set of functional labels of the proposed software project, and then use a regression analysis model to process the predicted set of functional labels as part of a process of estimating a cost of the proposed software project. Some embodiments use an NLP classifier model to process a natural language description of a proposed software project to obtain a prediction of a set of functional labels of the proposed software project, and then use a regression analysis model to process the predicted set of functional labels to obtain a prediction of a size of the proposed software project as part of a process of estimating a cost of the proposed software project. Some embodiments use an NLP classifier model to process a natural language description of a proposed software project to obtain a prediction of a set of functional labels of the proposed software project, and then use a regression analysis model to process the predicted set of functional labels to obtain a prediction of a size of the proposed software project, and then perform a calculation using the predicted size to determine an estimated cost of the proposed software project.

Some embodiments assembly a software development library that includes functional labels from one or more SDKs, APIs, or other authoritative resource for functional labels. Some embodiments then use the software development library data as a resource for searching through source code of previously completed software projects to help identify functional labels therein.

An embodiment can be implemented as a software application. The application implementing an embodiment can be configured as a modification of an existing estimating software application or hardware system, analysis system, as a separate application that operates in conjunction with an existing system, a standalone application, or some combination thereof.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
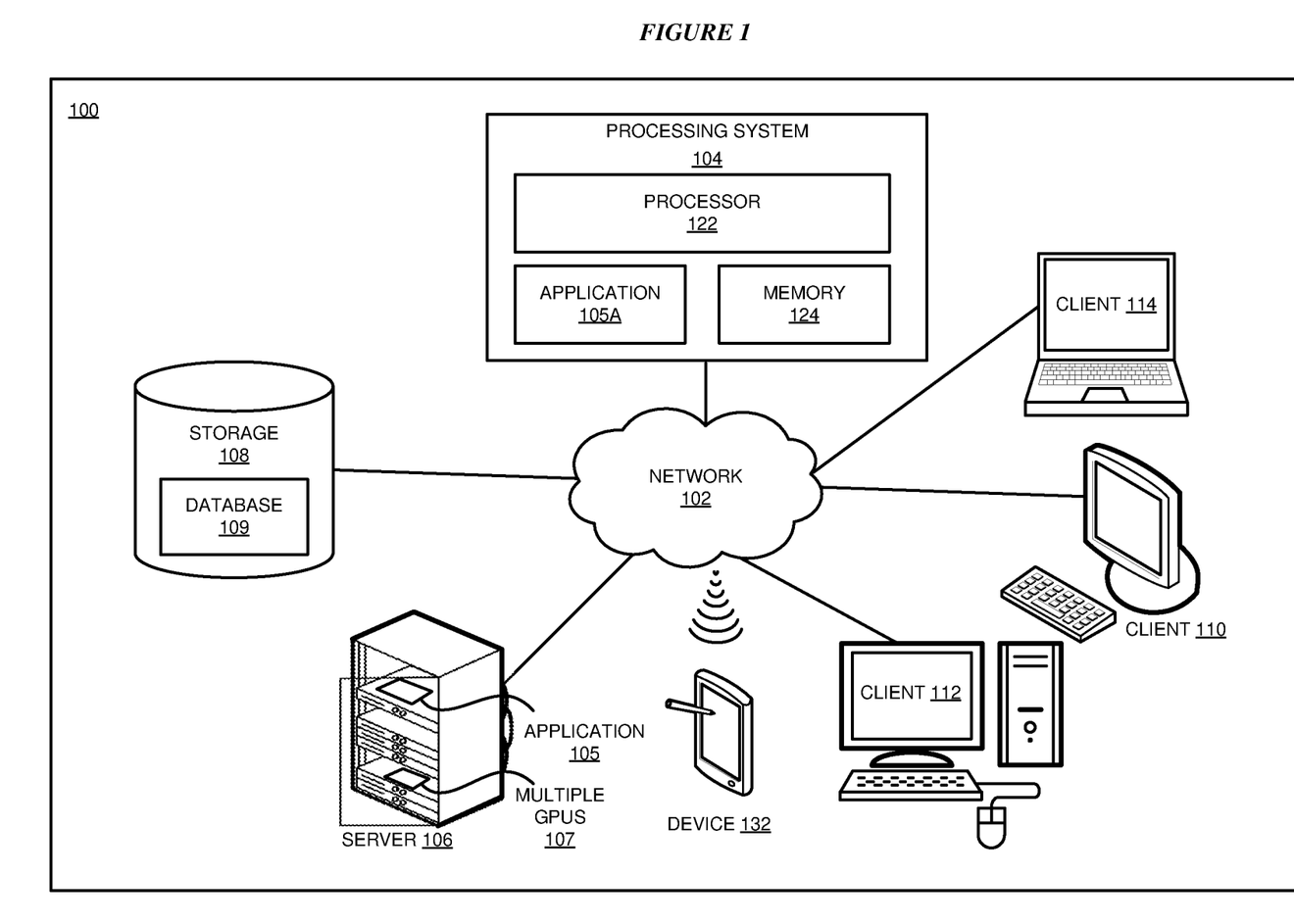
FIG. 1 depicts a block diagram of a network of data processing systems in which illustrative embodiments may be implemented.
Figure 2:
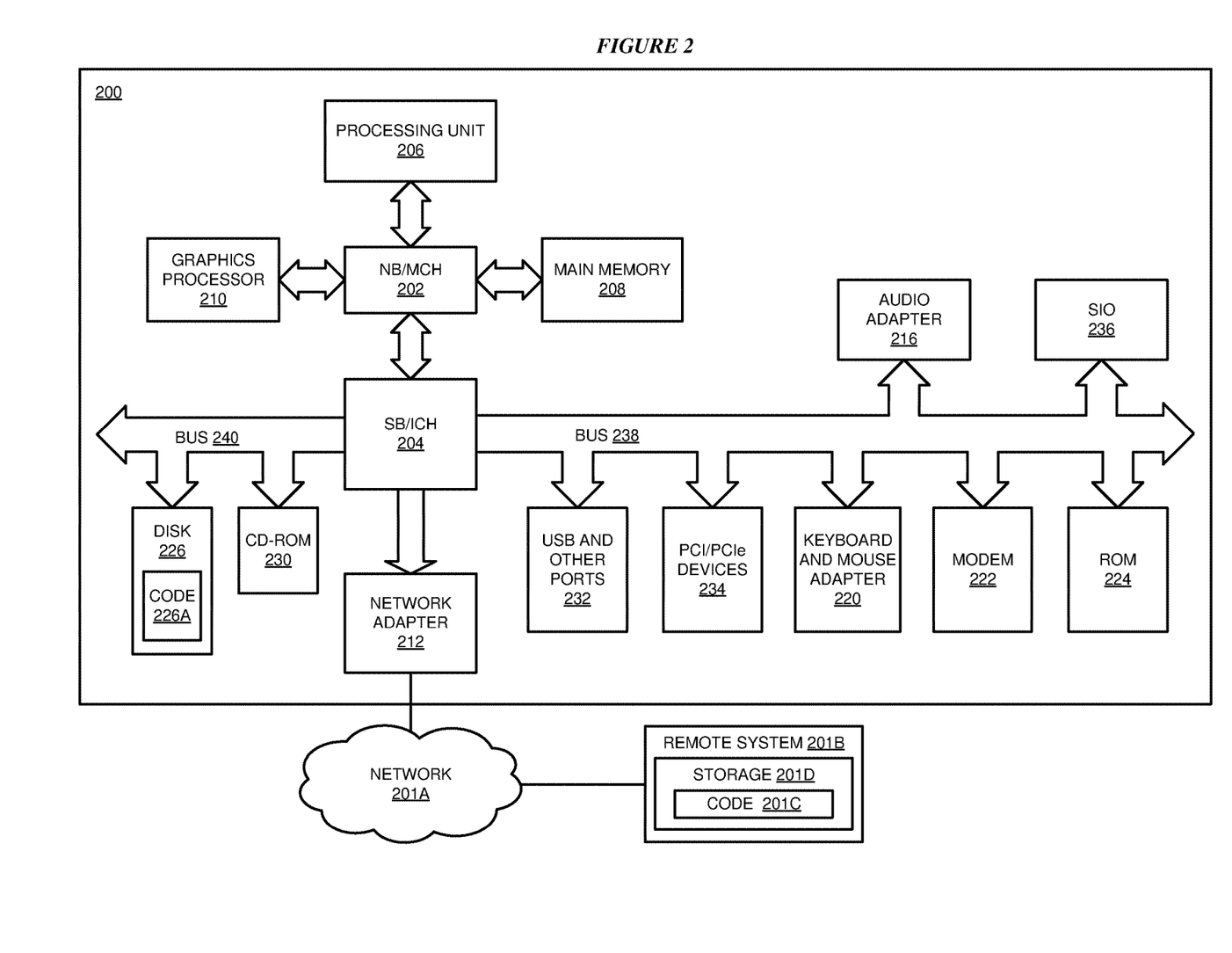
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto.

Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
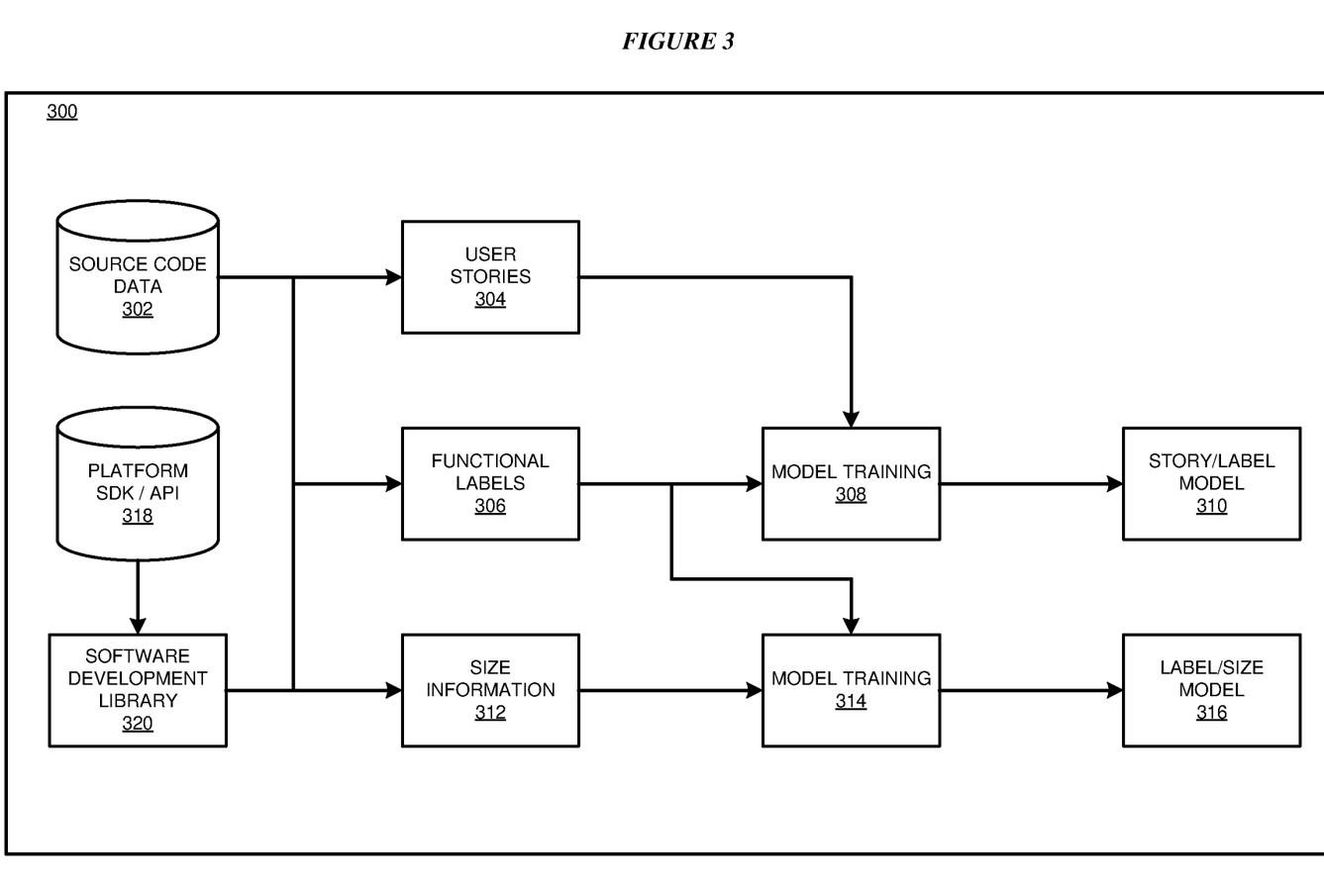
FIG. 3 depicts a block diagram of an example configuration for training machine-learning models in accordance with an illustrative embodiment.

With reference to FIG. 3, this figure depicts a block diagram of an example training application 300 in accordance with an illustrative embodiment. The illustrative embodiment includes first and second machine-learning training modules 308, 314 for training respective AI models. In a particular embodiment, the training application 302 is an example of application 105A of FIG. 1.

In some embodiments, the training application 300 includes a user stories module 304, a functional labels module 306, and a size information module 312. The term "functional label," as used herein, refers to features of a software program or application, particularly graphical features, such as a user-interface button, a map view, a calendar, a contacts listing, etc. A functional labels module 306 is configured to extract such functional labels from software source code. In some embodiments, the training application 300 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the first training module 308 uses Bayesian model or Topic Model to train a story/label model 310, which is an NLP classifier model. in some embodiments, the story/label model 310 is configured to perform a topic extraction on the natural language software descriptions. In some such embodiments, the natural language processing model is based on a Bayesian Model NLP algorithm. In an embodiment, the first training module 308 trains a natural language processing story/label model 310 to receive a natural language description of a software project, and output a corresponding set of functional labels. More specifically the first training module 308 trains the story/label model 310 to receive natural language software descriptions extracted from the source code data 302 and output functional labels 306.

In some embodiments, the source code data 302 is source code stored in a software repository or stored in a database but originally retrieved from a software repository based on a preselected list of completed software projects or search strings. In some embodiments, the natural language software descriptions extracted from the source code data 302 are user stories written to describe the functionality of the source code from which it is extracted. User stories include a written sentence or two and are typically written using the following pattern: As a [type of user], I want [some goal] so that [some reason or need]. User stories are written in non-technical terms from the perspective of the user, and therefore do not normally include functional labels.

In some embodiments, the first training module 308 also receives functional labels 306 extracted from the source code data 302 by the functional labels module 306, which provides the functional labels with corresponding user stories from user stories module 304, which extracts user stories or other natural language descriptions of software from the source code data 302 corresponding to the functional labels provided by the functional labels module 306 for training the first training module 308 to output such labels for the corresponding natural-language user stories. In some embodiments, the first training module 308 also receives functional labels from module 306 extracted from a software development library 320, which assembles functional labels from a Software Development Kit (SDK) or Application Programming Interface (API) 318. Some embodiments then use the software development library data as a resource for searching through source code of previously completed software projects to help identify functional labels therein.

In some embodiments, the second training module 314 generates a label/size model 316, which is a regression analysis model (e.g., logistic regression, neural networks, etc). In some such embodiments, the regression analysis model utilizes a neural network algorithm. In an embodiment, the second training module 314 trains the label/size model 316 to receive a set of functional labels and output a corresponding size of a software project, for example where size is measured in lines of code (LoC) or man-hours.

In some embodiments, the training set of functional labels from module 306 extracted from the source code data 302 by the functional labels module 306, which provides the functional labels for training the second training module 314. In some embodiments, the second training module 314 also receives functional labels from module 306 extracted from a software development library 320, which assembles functional labels from a Software Development Kit (SDK) or Application Programming Interface (API) 318. In some embodiments, the second training module 314 also receives size information from size information module 312 as size information input to the second training module 314 for a corresponding input set of functional labels.

Figure 4:
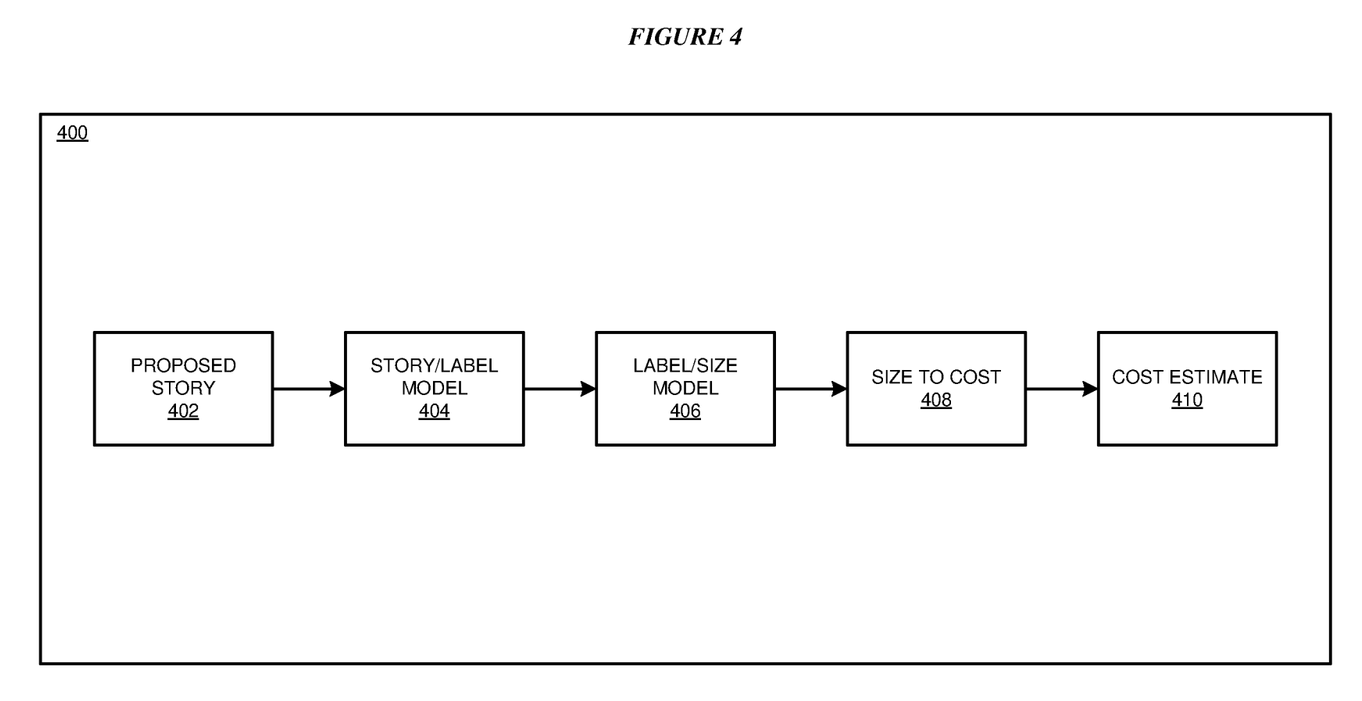
FIG. 4 depicts a block diagram of an example configuration for estimating a cost based on artificial-intelligence (AI) predicted labels and size in accordance with an illustrative embodiment.

With reference to FIG. 4, this figure depicts a block diagram of an example prediction application 400 in accordance with an illustrative embodiment. In a particular embodiment, the prediction application 400 is an example of application 105B of FIG. 1. The illustrative embodiment includes a story/label model 404 and a label/size model 406, which are embodiments of the story/label model 310 and the label/size model 316 in FIG. 3. The story/label model 404 and the label/size model 406 are for predicting software size when given a natural language software description from a proposed story module 402, which describes features of a proposed software project for which a cost estimate is being sought.

In some embodiments, the output of the label/size module 406 is a size, which is provided to a size to cost module 408. The size to cost module 408 calculates a cost based on the predicted size of a proposed software project described by the proposed story provided by the proposed story module 402. The relationship between story and cost can be based on a fixed relationship or function between size and cost. The cost is output to a cost estimate module 410, which generates a proposal for preparing software as described by the proposed story module 402.

Figure 5:
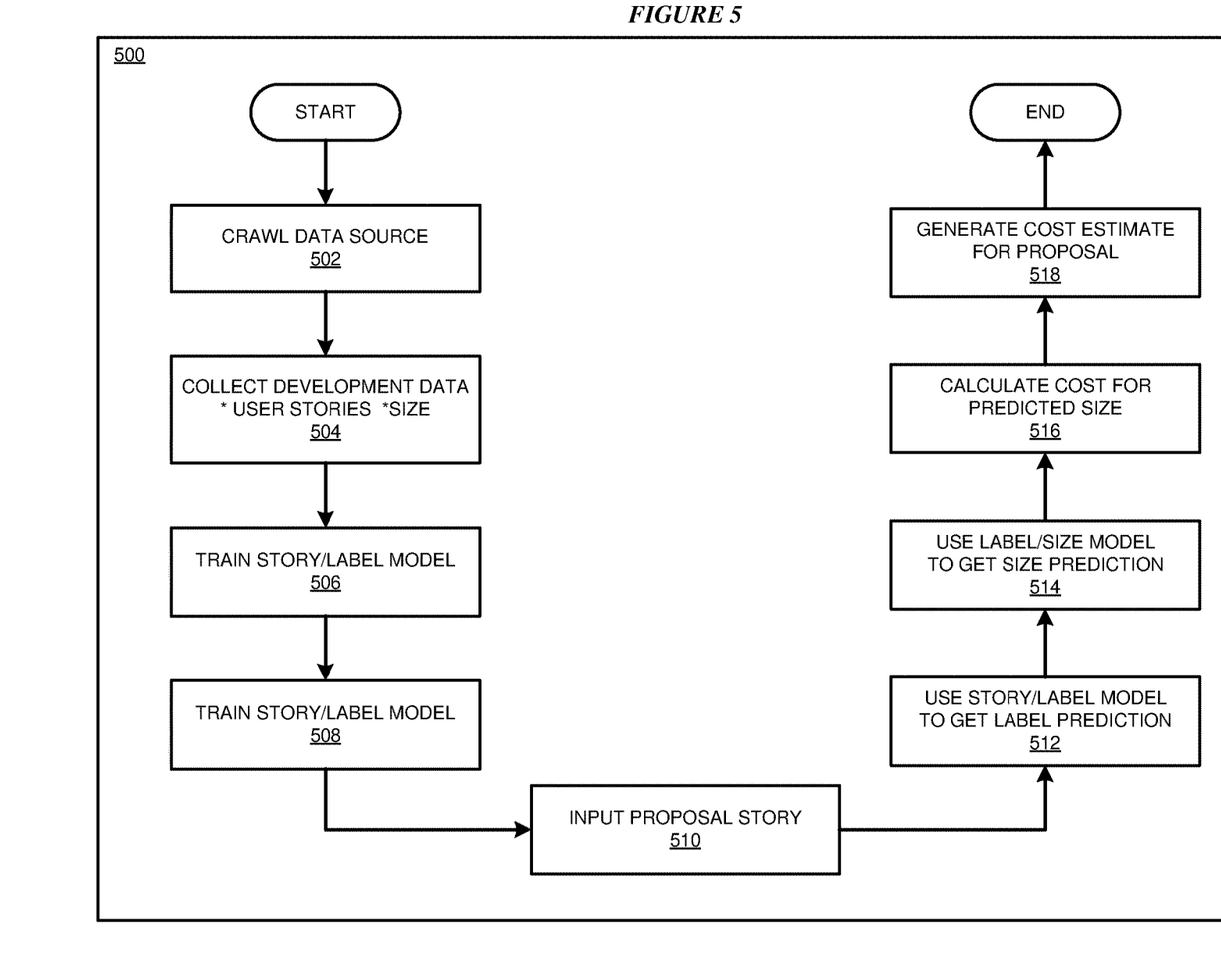
FIG. 5 depicts a flowchart of an example process for estimating a cost based on AI predicted labels and size in accordance with an illustrative embodiment.

With reference to FIG. 5, this figure depicts a flowchart of an example process 500 for creating cost estimate for a software project with an illustrative embodiment. In a particular embodiment, the training application 300 and prediction application 400 each carry out portions of the process.

In an embodiment, at block 502, the process crawls a data source to obtain training data for training a story/label model and a label/size model. In an embodiment, at block 504, data resulting from the crawls at block 504 is collected and stored. In some embodiments, blocks 502 and 504 are carried out by the user stories module 304, the functional labels module 306, and the size information module 312. The user stories module 304 crawls the source code data 302 to extract user stories or other natural language descriptions of software. The functional labels module 306 also crawls the source code data 302 to extract functional labels corresponding to the user stories or other natural language descriptions of software provided by the user stories module 304. The size information module 312 crawls the source code data 302 to extract size information corresponding to the user stories or other natural language descriptions of software provided by the user stories module 304.

In some embodiments, at block 506, the first training module 308 uses Bayesian model or Topic Model to train a story/label model 310 to receive a natural language description of a software project, and output a corresponding set of functional labels. Next, at block 508, the second training module 314 uses a regression analysis model to train a label/size model 316 to receive a set of labels and output a size of an application having the input functional labels.

In some embodiments, at block 510 a proposal story, which includes a natural language description of a software proposal, is prepared. Next, at block 512, the input proposal story is input to the trained story/label model that was trained at block 506, and the story/label model outputs a predicted set of functional labels for the software described by the input proposal story. Next, at block 514, the set of labels output by the story/label model is provided to the label/size model, which in turn outputs a predicted size of the software described by the input proposal story from block 510. In some embodiments, at block 516, the process 500 calculates a cost based on the predicted size of a proposed software project described by the proposed story provided by the proposed story module 402. The relationship between story and cost can be based on a fixed relationship or function between size and cost. In some embodiments, at block 518, the process 500 uses the cost from block 516 to create a proposal for preparing software as described by the proposal story from block 510 for the estimated cost from block 516.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, the method comprising:
    receiving a natural language (NL) software description for a completed software project;
    receiving an electronic source code file for the completed software project;
    storing, in the computer memory, a first input set of functional labels assembled in a software development library;
    storing, in a computer memory, a second input set of functional labels and size data extracted from the electronic source code file of the completed software project, each the second input set of functional labels corresponding to at least one of the labels in the first input set of functional labels, the completed software project having a corresponding NL software description;
    training a NL processing model such that the model outputs a project set of functional labels for the source code file using the NL software description as an input sample corresponding to functional labels from the second input set of functional labels;
    training a regression analysis model such that the model outputs a project size for the source code file using the project set of functional labels as an input sample corresponding to a project size from the size data;
    predicting, using the NL processing model, a proposal set of functional labels;
    predicting, using the regression analysis model, a proposal size;
    calculating a proposal cost based at least in part on the proposal size; and
    preparing a software development proposal that includes a NL proposed-software description and the proposal cost.

2. The method of claim 1, further comprising searching a software repository for a preselected list of completed software projects.

3. The method of claim 2, further comprising searching for a NL description of a related completed software project for any of the preselected list of completed software projects.

4. The method of claim 1, wherein at least one of the NL software descriptions includes a description of at least one user-interface element.

5. The method of claim 1, further comprising assembling the software development library using functional labels from Application Programming Interface.

6. The method of claim 1, further comprising assembling the software development library using functional labels from a Software Development Kit.

7. The method of claim 1, wherein the regression analysis model utilizes a neural network algorithm.

8. The method of claim 1, wherein the calculating of the proposal cost based at least in part on the proposal size includes calculating the proposal cost based at least in part on a fixed relationship between proposal size and cost.

9. The method of claim 1, further comprising performing a topic extraction on the NL software descriptions.

10. The method of claim 1, wherein the NL processing model is based on a Bayesian Model NLP algorithm.

11. A computer usable program product comprising a computer-readable storage device, and program instructions stored on the storage device, the stored program instructions comprising:
    program instructions to receive, by one or more processors, a natural language (NL) software description for a completed software project;
    program instructions to receive, by one or more processors, an electronic source code file for the completed software project;
    program instructions to store, by one or more processors, in the computer memory, a first input set of functional labels assembled in a software development library;
    program instructions to store, by one or more processors, in a computer memory, a second input set of functional labels and size data extracted from the electronic source code file of the completed software project, each the second input set of functional labels corresponding to at least one of the labels in the first input set of functional labels, the completed software project having a corresponding NL software description;
    program instructions to train, by one or more processors, a NL processing model such that the model outputs a project set of functional labels for the source code file using the NL software description as an input sample corresponding to functional labels from the second input set of functional labels;
    program instructions to train, by one or more processors, a regression analysis model such that the model outputs a project size for the source code file using the project set of functional labels as an input sample corresponding to a project size from the size data;
    program instructions to predict, by one or more processors, using the NL processing model, a proposal set of functional labels;
    program instructions to predict, by one or more processors, using the regression analysis model, a proposal size;
    program instructions to calculate, by one or more processors, a proposal cost based at least in part on the proposal size; and
    program instructions to prepare, by one or more processors, a software development proposal that includes a NL proposed-software description and the proposal cost.

12. A computer usable program product of claim 11, further comprising:
    searching a software repository for a preselected list of completed software projects; and
    searching for a NL description of a related completed software project for any of the preselected list of completed software projects.

13. A computer usable program product of claim 11, wherein at least one of the NL software descriptions includes a description of at least one user-interface element.

14. A computer usable program product of claim 11, further comprising performing a topic extraction on the NL software descriptions.

15. A computer usable program product of claim 11, further comprising assembling the software development library using functional labels from at least one of an Application Programming Interface and a Software Development Kit.

16. A computer system comprising a processor, a computer-readable memory, and a computer-readable storage device, and program instructions stored on the storage device for execution by the processor via the memory, the stored program instructions comprising:
   program instructions to receive, by one or more processors, a natural language (NL) software description for a completed software project;
   program instructions to receive, by one or more processors, an electronic source code file for the completed software project;
   program instructions to store, by one or more processors, in the computer memory, a first input set of functional labels assembled in a software development library;
   program instructions to store, by one or more processors, in a computer memory, a second input set of functional labels and size data extracted from the electronic source code file of the completed software project, each the second input set of functional labels corresponding to at least one of the labels in the first input set of functional labels, the completed software project having a corresponding NL software description;
   program instructions to train, by one or more processors, a NL processing model such that the model outputs a project set of functional labels for the source code file using the NL software description as an input sample corresponding to functional labels from the second input set of functional labels;
   program instructions to train, by one or more processors, a regression analysis model such that the model outputs a project size for the source code file using the project set of functional labels as an input sample corresponding to a project size from the size data;
   program instructions to predict, by one or more processors, using the NL processing model, a proposal set of functional labels;
   program instructions to predict, by one or more processors, using the regression analysis model, a proposal size;
   program instructions to calculate, by one or more processors, a proposal cost based at least in part on the proposal size; and
   program instructions to prepare, by one or more processors, a software development proposal that includes a NL proposed-software description and the proposal cost.

17. A computer system of claim 16, further comprising:
   searching a software repository for a preselected list of completed software projects; and
   searching for a NL description of a related completed software project for any of the preselected list of completed software projects.

18. A computer system of claim 16, wherein at least one of the NL software descriptions includes a description of at least one user-interface element.

19. A computer system of claim 16, further comprising performing a topic extraction on the NL software descriptions.

20. A computer system of claim 16, further comprising assembling the software development library using functional labels from at least one of Application Programming Interface and a Software Development Kit.

* * * * *